(12) United States Patent
Subbaian (10) Patent No.: US 9,338,324 B1
(45) Date of Patent: May 10, 2016

(54) SYSTEMS AND METHODS FOR RULE-BASED THIN-LINE ENHANCEMENT IN HALFTONE IMAGES

(71) Applicant: XEROX CORPORATION, Norwalk, CT (US)

(72) Inventor: Sudhagar Subbaian, Coimbatore (IN)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/708,391

(22) Filed: May 11, 2015

(51) Int. Cl.
*H04N 1/405* (2006.01)
*H04N 1/409* (2006.01)
*G06K 15/02* (2006.01)

(52) U.S. Cl.
CPC .......... *H04N 1/4092* (2013.01); *G06K 15/1844* (2013.01); *G06K 15/1873* (2013.01); *H04N 1/405* (2013.01)

(58) Field of Classification Search
None
See application file for complete search history.

(56) References Cited

U.S. PATENT DOCUMENTS

| 6,944,341 B2 | 9/2005 | Loce et al. |
| 7,539,351 B2 | 5/2009 | Xu et al. |
| 7,586,650 B2 * | 9/2009 | Washio ................ H04N 1/4092 358/3.06 |

FOREIGN PATENT DOCUMENTS

JP        2012157998 A  *  8/2012

* cited by examiner

*Primary Examiner* — Scott A Rogers (57) ABSTRACT

Embodiments of a computer-implemented method for thin-line enhancement in electronic images are disclosed. The methods include receiving a halftone image comprising multiple pixels, and associating a predefined kernel with at least a portion of the halftone image. The kernel includes multiple check cells and a processing cell, each capable of being toggled between an active state and an inactive state; detecting a state of each of the pixels in the neighborhood of an inactive pixel associated with the processing cell based on one or more predetermined rules being applied to the kernel, wherein the inactive pixel is in communication with a contiguous set of active pixels; and selectively activating the inactive pixel by activating the processing cell based on the predetermined rules, provided the inactive pixel upon being activated is separated from a neighboring active pixel.

24 Claims, 10 Drawing Sheets

SYSTEMS AND METHODS FOR RULE-BASED THIN-LINE ENHANCEMENT IN HALFTONE IMAGES

TECHNICAL FIELD

The presently disclosed embodiments relate to raster image processing, and more particularly to systems and methods for rule-based thin-line enhancement.

BACKGROUND

Digital images are made up of pixels having multiple components such as color and intensity that are uniquely defined for different image types. For example, binary digital images have bi-level values, i.e., two possible values, for each pixel, namely, black (represented by the number "1") or white (represented by the number "0"). On the other hand, grayscale or continuous tone digital images have multiple bits per pixel, such as 8-bit value per pixel comprising 256 tones or shades of gray for each pixel in the image (gray levels of 0 to 255). Such bi-level pixels or multiple-bit pixels are represented by color planes in color images, where the pixels of different component colors are combined on a print medium, for example, a paper, to form a dot. The dot color represents a combination of tone values in different color planes.

Various conditions and/or scenarios may be relevant to the printing of lines or curves that may be only one or two pixels in width. Often, printers, plotters, or other printing devices that transfer data or images onto a print medium are required to print curved or straight thin lines that may only be partially visible on a print medium at certain resolutions (depending on the printing device) due to operational dot gain and dot loss of the printing device. Existing methods for thin-line enhancement include template-matching to detect thin lines that are dependent on halftone growth, halftone frequency, and printer resolution. Such dependencies increase the computation load on the printer processor, which lowers efficiency resulting in longer print times, and may not consistently enhance thin lines at the pixel level of resolution. Other thin-line enhancement methods, such as those based on tone response curve (TRC) of each pixel, are prone to introduce artifacts across the entire print medium during a print operation. In other words, prior methods of thin-line enhancement are susceptible to unwanted merging of two or more thin-lines with each another or an adjacent line in close proximity during thin-line width enhancement.

Thus, it would be advantageous to provide a computationally efficient and thin-line enhancement method that avoids merging of thin lines with neighboring pixels in an image.

SUMMARY

Embodiments of the present disclosure include systems and methods for—enhancing thin line processing on a printing device, or any other computing device-enhanced thin-line printing onto a print medium. The present systems and methods are advantageously configured to operate independent of halftone growth, halftone frequency, and print device resolution.

One exemplary embodiment of the present disclosure includes a computer-implemented method for thin-line enhancement in electronic images. The method comprises receiving, using a rule-based thin-line enhancement unit, a halftone image comprising a plurality of pixels; associating, using the rule-based thin-line enhancement unit, a predefined kernel with at least a portion of the halftone image, wherein the kernel includes a plurality of check cells and at least one processing cell, each capable of being toggled between an active state and an inactive state; detecting, using the rule-based thin-line enhancement unit, a state of each of the plurality of pixels in the neighborhood of at least one inactive pixel associated with the at least one processing cell based on one or more predetermined rules being applied to the kernel, wherein the at least one inactive pixel is in communication with a contiguous set of active pixels; and selectively activating, using the rule-based thin-line enhancement unit, the at least one inactive pixel by activating the processing cell based on the one or more predetermined rules being true, provided the at least one inactive pixel upon being activated is separated from a neighboring active pixel.

Another exemplary embodiment of the present disclosure includes a system for thin-line enhancement of electronic images. The system includes an imaging unit, a halftone generator, a memory unit, and a rule-based thin-line enhancement unit. The imaging unit may be configured to capture an electronic image of a predetermined resolution. The halftone generator may be configured to convert the captured electronic image into a halftone image comprising a plurality of pixels. The memory unit may be configured to store a predefined kernel including a plurality of check cells and at least one processing cell, each capable of being toggled between an active state and an inactive state. The rule-based thin-line enhancement unit may be configured to: receive the halftone image from the halftone generator and the kernel from the memory unit; associate the kernel with at least a portion of the halftone image; detect a state of each of the plurality of pixels in the neighborhood of at least one inactive pixel associated with the at least one processing cell based on one or more predetermined rules being applied to the kernel, wherein the at least one inactive pixel is in communication with a contiguous set of active pixels; and selectively activate the at least one inactive pixel by activating the processing cell based on the one or more predetermined rules being true, provided the at least one inactive pixel upon being activated is separated from a neighboring active pixel.

Yet another exemplary embodiment of the present disclosure includes a non-transitory computer-readable medium comprising computer-executable instructions for computing trust index among a plurality of entities associated with a resource marketplace. The non-transitory computer-readable medium comprises instructions for: receiving a halftone image comprising a plurality of pixels; associating a predefined kernel with at least a portion of the halftone image, wherein the kernel includes a plurality of check cells and at least one processing cell, each capable of being toggled between an active state and an inactive state; detecting a state of each of the plurality of pixels in the neighborhood of at least one inactive pixel associated with the at least one processing cell based on one or more predetermined rules being applied to the kernel, wherein the at least one inactive pixel is in communication with a contiguous set of active pixels; and selectively activating the at least one inactive pixel by activating the processing cell based on the one or more predetermined rules being true, provided the at least one inactive pixel upon being activated is separated from a neighboring active pixel.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DETAILED DESCRIPTION

The following detailed description is made with reference to the figures. Some of the embodiments are described to illustrate the disclosure, not to limit its scope, which is defined by the claims. Those of ordinary skill in the art will recognize a number of equivalent variations in the description that follows.

Various embodiments describe systems and methods for rule-based thin-line enhancement in digital images, such as a halftone image, printable on a print medium. The embodiments include a rule-based thin-line enhancement unit that enhances the thickness or width of thin lines in color planes to relatively improve the thin line's visibility. The systems and methods use predetermined rules to detect pixel patterns in close proximity of a thin curve, such as a thin line, whose thickness may be increased by activating an inactive pixel in communication with the thin line in the detected pixel patterns. The embodiments can dynamically enhance the thickness or width of a thin line by one or more levels processing based on a predetermined spacing between the inactive pixel and an active pixel in the pixel patterns. Some advantages to the embodiments include method and systems for enhancement of thin lines that are independent of halftone growth, halftone frequency, and print device resolution. The methods and systems are made suitable for various applications including, but not limited to, fine line graphic prints, computer aided design prints, architecture and design layout applications, laserjet prints, inkjet prints, bubble jet prints, 3-D prints, etc. Further, the embodiments are computationally light and can reproduce enhanced thin lines in an electronic image, such as a halftone image, at certain resolutions, for example, 600 dots-per-inch (DPI) or above, without merging each thin line with neighboring active pixels.

As used herein, "electronic image" means any electronic media content that is intended to be used in an electronic form or transmitted to a marking engine to be printed. Exemplary electronic image file types may include various digital images, text, and mixed content files, such as PDF, TXT, DOC, TIFF, BMP, GIF, JPEG, and other common page description language (PDL) file and document formats, such as Adobe® Postscript®. Pixels in the electronic image may be formatted, in some instances, as binary image data. Binary image data is single bit or bi-level, with only two possible values. More particularly, pixel values may be either ON (e.g., value=1) denoting an active pixel, or OFF (e.g., value=0) denoting a background pixel. In some embodiments, the background pixel may be a white pixel or vice versa.

In addition, as used in the embodiments, a "thin line" can include any curved or straight, contiguous or non-contiguous group of pixels printed on a print medium that could be enhanced by the embodiments. For purposes of illustration, in some embodiments, a thin line can be a generally contiguous procession of pixels, which may be active or inactive in a halftone image, having a width of about two pixels or less, depending on the image resolution. For example, at 1200 dpi, a one pixel wide line may be considered a thin line, and at 2400 dpi, a two pixel wide line may be considered a thin line. However, the method may be applied to lines having a width of more than two pixels. Such thin lines may be of any shape (e.g., linear, curved or free-flowing, etc.) or orientation (e.g., horizontal, vertical, slanted or angled, etc.) with respect to (1) the image background, or (2) orientation of print media. There is no specific limit on the length of lines that can be relevant to the embodiments, such as the thin lines described above.

Exemplary Embodiments

Figure 1:
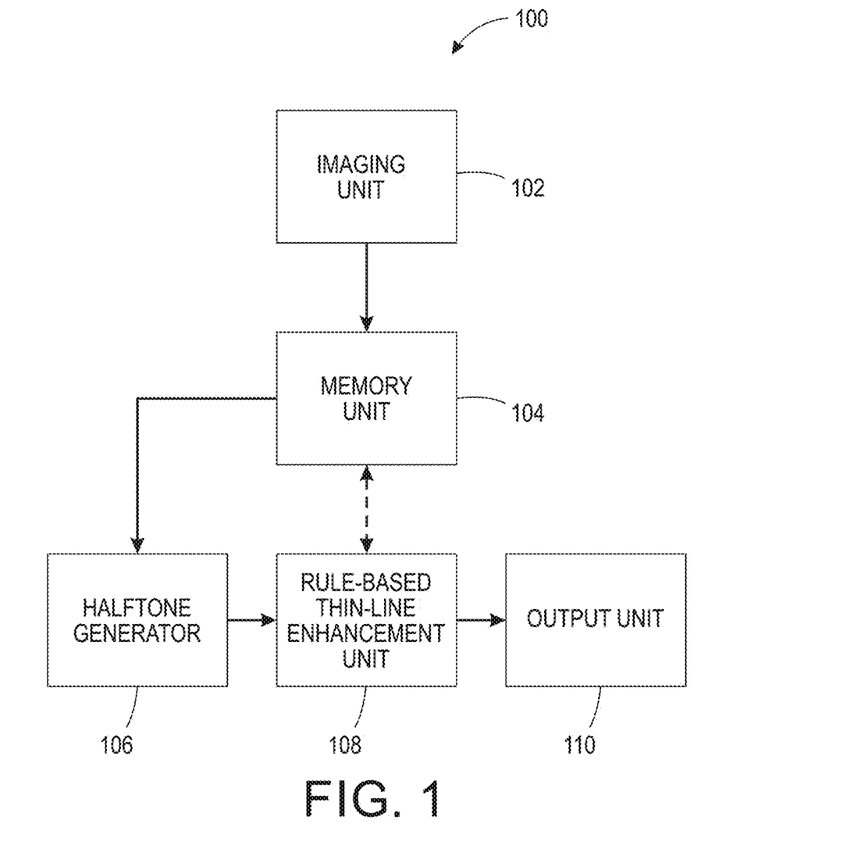
FIG. 1 illustrates an exemplary rule-based thin-line enhancement unit, according to an embodiment of the present disclosure.

FIG. 1 illustrates an exemplary system for implementing a rule-based thin-line enhancement unit, according to an embodiment of the present disclosure. The system 100 includes an imaging unit 102, a memory unit 104, a halftone generator 106, a rule-based thin-line enhancement unit 108 (hereinafter referred to as enhancement unit 108), and an output unit 110. The imaging unit 102 may include a variety of components such as a camera, scanner, microcontroller, etc., to convert a physical document to digital document or to capture an image from an ambient environment. In a first example, the imaging unit 102 may include a color video camera such as an HD webcam with at least one imaging channel for capturing color values for pixels corresponding generally to primary visible colors (typically RGB). In a second example, the imaging unit 102 may include an infrared (IR) camera with at least one imaging channel for measuring pixel intensity values in the near-infrared (NIR) wavelength range. In a third example, the imaging unit 102 may include a hybrid device capable of capturing both color and NIR video. In a fourth example, the imaging unit 102 may include a multispectral or hyperspectral camera device capable of capturing images at multiple wavelength bands. In some embodiments, the imaging unit 102 may include IR or NIR illuminators so that an image may be correctly captured even in dark or low light conditions. The imaging unit 102 may communicate the captured images to one or more devices such as a memory unit 104 over a network (not shown) including multiple communication channels.

The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network may include multiple networks or sub-networks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice, video, and data communications.

The memory unit 104 may comprise any computer-readable medium known in the art, related art, or developed later including, for example, a single processor or multiple processors operatively connected together, volatile memory (e.g., RAM), non-volatile memory (e.g., flash, etc.), disk drive, etc., or any combination thereof. The memory unit 104 may receive and store the electronic image(s) captured by the imaging unit 102. In some embodiments, the memory unit 104 may receive an electronic image directly or indirectly from a storage media (e.g., a compact disk, a flash drive, a memory card, etc.); a computing device (e.g., a mobile phone, a server, etc.) through various interfaces (e.g., Universal Serial Bus (USB) port, Peripheral Component Interconnect (PCI) port, etc.); and so on over the network. In one embodiment, the memory unit 104 may store a predefined kernel for being used by the enhancement unit 108 to manipulate pixels of the halftone image for thin-line enhancement, discussed later in greater detail. The memory unit 104 may also store values of the halftone image pixels in one or more variables associated with the kernel.

Halftone generator 106 may receive or fetch the electronic image and its associated image data from the memory unit 104. The halftone generator 106 generates halftone cells for the electronic image based on the image data and bitmap codes using a variety of halftone screens. The halftone generator 106 may apply a separate halftone screen for each color channel in a color model such as CMYK (Cyan, Magenta, Yellow, Key or Black) and RGB (Red, Green, Blue) implemented on the electronic image. Each of the halftone screens operate at different screen angles and screen frequencies for each color channel to avoid the Moiré effect from appearing in the halftone image. In some embodiments, a thin line may appear in the halftone image when any pair of applied halftone screens is oriented at, for example, 90 degrees or 45 degrees from each other.

The halftone generator 106 represents these halftone cells as patterns of dots, or ink drops, to convert, for example, a continuous tone bitmap image into a halftone image that has a pattern of dots for application to a tangible print medium (e.g., a paper). The dot sizes and the spacing between dots may vary in the halftone image based on the bitmap codes, which may be generated by a bitmap generator (not shown), based upon a desired dot pattern to be embedded within the halftone image. The desired dot pattern may be inputted to the bitmap generator by a user using any of the known input devices, for example, a keyboard (not shown). The halftone generator 106 may store the generated halftone image in the memory unit 104 or transmit the halftone image to the enhancement unit 108. The generated halftone image may comprise a number of active pixels (e.g., having a value=1) and inactive pixels (e.g., having a value=0).

The enhancement unit 108 may be configured to receive the halftone image from the memory unit 104 or the halftone generator 106. The enhancement unit 108 may represent any type of computing device, such as the computing device described above, that is capable of configuring and processing the methods of the embodiments. The enhancement unit 108 may be implemented as a standalone and dedicated device including hardware and installed software, where the hardware is compatible with the requirements and/or functionality of the software. Alternatively, the enhancement unit 108 may be implemented as a software application or a device driver. In some other embodiments, the enhancement unit 108 may be configured to expose its computing environment or operating code to a user, and may include related art I/O devices, such as a keyboard or display. The enhancement unit 108 of some embodiments may, however, include software, firmware, or other resources that support remote administration and/or maintenance of the enhancement unit 108.

In further embodiments, the enhancement unit 108 either in communication with networked devices, such as the memory unit 104 and the output unit 110, or independently, may have video, voice, and data communication capabilities (e.g., unified communication capabilities) by being coupled to or including, various imaging devices (e.g., cameras, printers, scanners, medical imaging systems, etc.), various audio devices (e.g., microphones, music players, recorders, audio input devices, speakers, audio output devices, telephones, speaker telephones, etc.), various video devices (e.g., monitors, projectors, displays, televisions, video output devices, video input devices, camcorders, etc.), or any other type of hardware, in any combination thereof. In some embodiments, the enhancement unit 108 may comprise or implement one or more real time protocols (e.g., session initiation protocol (SIP), H.261, H.263, H.264, H.323, etc.) and non-real time protocols known in the art, related art, or developed later to facilitate data transfer among the imaging unit 102, the memory unit 104, the halftone generator 106, the enhancement unit 108, the output unit 110, and any other network device.

In some embodiments, the enhancement unit 108 may be configured to convert communications, which may include instructions, queries, data, etc., from, for example, the imaging unit 102, the memory unit 104, and the halftone generator 106, into appropriate formats to make these communications compatible with the output unit 110, and vice versa. Consequently, the enhancement unit 108 may allow implementation of the output unit 110 using different technologies or by different organizations, e.g., a third-party vendor, managing the output unit 110 or associated services using a proprietary technology.

The enhancement unit 108 may be implemented by way of a single device (e.g., a computing device, a processor or an electronic storage device) or a combination of multiple devices that are operatively connected or networked together in a single location or that are separated by large distances. In some embodiments, the enhancement unit 108 may be a hardware device including processor(s) executing machine readable program instructions for analyzing data, and interactions between the halftone generator 106 or the memory unit 104, and the output unit 110. The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor(s) may include, for example, microprocessors, microcomputers, microcontrollers, digital signal processors, central processing units, state machines, logic circuits, and/or any devices that manipulate signals based on operational instructions. Among other capabilities, the processor(s) may be configured to fetch and execute computer readable instructions in a dedicated or shared memory associated with the enhancement unit 108 for performing tasks such as signal coding, data processing input/output processing, power control, and/or other functions.

In some embodiments, the enhancement unit 108 may include, in whole or in part, a software application working alone or in conjunction with one or more hardware resources. Such software applications may be executed by the processor(s) on different hardware platforms or emulated in a virtual environment. Aspects of the enhancement unit 108 may leverage known, related art, or later developed off-the-shelf software. Other embodiments may comprise the enhancement unit 108 being integrated or in communication with a mobile switching center, network gateway system, Internet access node, application server, IMS core, service node, or some other communication systems, including any combination thereof. In some embodiments, the enhancement unit 108 may be integrated with or implemented as a wearable device including, but not limited to, a fashion accessory (e.g., a wrist band, a ring, etc.), a utility device (a handheld baton, a pen, an umbrella, a watch, etc.), a body clothing, or any combination thereof.

The enhancement unit 108 may be preconfigured or dynamically configured to automatically, or upon user request, enhance thin lines in the halftone image using the predefined kernel based on predetermined rules. The enhancement unit 108 may include a variety of known, related art, or later developed interface(s), including software interfaces (e.g., an application programming interface, a graphical user interface, etc.); hardware interfaces (e.g., cable connectors, a keyboard, a card reader, a barcode reader, a biometric scanner, an interactive display screen, etc.); or both.

In another embodiment, the enhancement unit 108 may be preconfigured or dynamically configured to interact with the halftone generator 106, or the memory unit 104, and the output unit 110 via a server (not shown) over the network. The server may be installed, integrated, or operatively associated with the enhancement unit 108. The server may be implemented as any of a variety of computing devices including, for example, a general purpose computing device, multiple networked servers (arranged in clusters or as a server farm), a mainframe, or so forth.

In other embodiments, the enhancement unit 108 may be installed on or integrated with any network appliance (not shown) configured to establish the network between the enhancement unit 108 and other devices such as the memory unit 104, the halftone generator 106, and the output unit 110. At least one of the enhancement unit 108 and the network appliance may be capable of operating as or providing an interface to assist exchange of software instructions and data among the memory unit 104, the halftone generator 106, and the output unit 110. In some embodiments, the network appliance may be preconfigured or dynamically configured to include the enhancement unit 108 integrated with other devices. For example, the enhancement unit 108 may be integrated with the halftone generator 106 or any other user device (not shown) connected to the network. The halftone generator 106 may include a module (not shown), which enables that the halftone generator 106 being introduced to the network appliance, thereby enabling the network appliance to invoke the enhancement unit 108 as a service. Examples of the network appliance include, but are not limited to, a DSL modem, a wireless access point, a router, a base station, and a gateway having a predetermined computing power sufficient for implementing the enhancement unit 108. The enhancement unit 108 may generate an enhanced halftone image in which the width of thin lines may be increased and transmit the enhanced halftone image to the output unit 110. In some embodiments, the enhancement 108 may store the enhanced halftone image in the memory unit 104.

The output unit 110 may be in communication with the enhancement unit 108 via a wired or wireless connection to receive the enhanced halftone image from the enhancement unit 108 or the memory unit 104. Examples of the output unit 110 may include, but without limitation, a handling device such as a print head controller; a storage device such as the memory unit 104; or any computing device such as a laptop, a mobile phone, and a printer. In one embodiment, the output unit 110 may be configured to store, process, or print the enhanced halftone image. For example, the output unit 110 may be a printer including one or more printing or marking engines configured to print an electronic image, with or without thin line enhancement. The marking engines may be configured for various printing technologies, such as, for example, xerographic, ink-jet (bubble jet), laser, offset, solid-ink, dye sublimation, or the like. One having ordinary skill in the art will understand that these printing technologies are merely exemplary and others may similarly be used.

Figure 2:
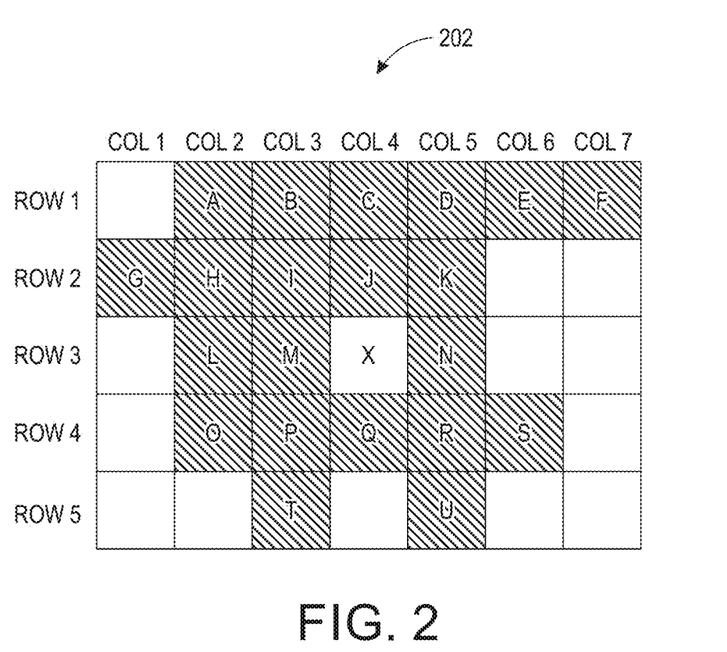
FIG. 2 illustrates an exemplary kernel used by the rule-based thin-line enhancement unit of FIG. 1, according to an embodiment of the present disclosure.

FIG. 2 illustrates an exemplary kernel implemented by the rule-based thin-line enhancement unit of FIG. 1, according to an embodiment of the present disclosure. The enhancement unit 108 may implement a predefined kernel 202 to process one or more pixels in a halftone image. The kernel 202 may refer to a matrix of cells that defines a region of interest in an electronic image, such as the halftone image, where predetermined rules may be applied. The size of the matrix of cells, or kernel size, can be configured to provide appropriate control of line growth while determining an adequate distance between two adjacent lines. In one embodiment, the size of the matrix of cells can be configured based on the number of thin lines to be determined in the halftone image. For example, for purposes of illustrating the embodiments, the enhancement unit 108 may implement the kernel 202 as a 5×7 matrix, hereinafter also referred to as 5×7 kernel, comprising five rows and seven columns for determining at least one closely-spaced pair of thin lines in the halftone image. Each row represents a memory space that is 32 bit wide in the memory unit 104. Each cell (e.g., A, B, C, . . . X) is 32 bit wide word that are shifted on pixel-by-pixel basis in the halftone image to obtain specific locations. In some embodiments, the enhancement unit 108 may change the kernel orientation based on the orientation of the halftone image. For example, the enhancement unit 108 may transpose the 5×7 kernel 202 that may be a landscape orientation into a 7×5 kernel having seven rows and five columns for the halftone image in a portrait orientation. Other embodiments may configure the kernel 202 into various suitable sizes such as 6×7 matrix (i.e., having six rows and seven columns), 8×7 matrix (i.e., having eight rows and seven columns), and 9×9 matrix (i.e., having nine rows and nine columns) being implemented by the enhancement unit 108. One ordinarily skilled in the art will understand that the kernel 202 may be implemented to have (i) a relatively smaller size, and (ii) the number of rows being lesser than the number of columns to improve the computational efficiency.

As shown in FIG. 2, the kernel 202 may include thirty five cells, hereinafter also referred to as check cells, each check cell being representative of one or more pixels when the kernel 202 is associated with the halftone image. Each check cell may be capable of being toggled between an active state and an inactive state. The kernel 202 may be applied with predetermined rules, such as those discussed below, to convert a predefined set of check cells into rule cells. A rule cell may be defined as a set of check cells being in active state based on the applied predetermined rules. For example as shown in FIG. 2, the kernel 202 includes rule cells A to U that are in active state based on the applied predetermined rules. In some embodiments, each rule cell may include one or more check cells. The enhancement unit 108 may use such rule cells to detect one or more thin lines, their respective directions and spacing there between. The kernel 202 may also include one or more processing cells at predefined locations. In one embodiment, the kernel 202 may include a single processing cell X at the coordinate (3, 4) of the kernel 202. The coordinate (3, 4) refers to the third row and fourth column of the kernel 202.

The processing cell X may be associated with each pixel of the halftone image to detect a neighboring pixel pattern comprising, for example, one or more inactive pixels, which may refer to white pixels in the halftone image, where such neighboring pixel pattern is in communication with an active pixel, which may refer to one or more dark or black pixels in communication with the thin line, in the halftone image. The enhancement unit 108 may toggle the processing cell X to activate the inactive pixel for placing an additional dot or active pixel (i.e., a black or any color pixel) to increase the width of the thin line based on various predetermined rules. Examples of such rules are shown in equations 1 to 4.

$$(M\&(\sim N\&(\sim K\&(Q((H|G|I)|(\sim P\&\sim I\&\sim J\&\sim H\&\sim G)))| \\ (\sim R\&((\sim J\&(I|Q)\&(B|T))|(L\&O\&(I|T))))| \\ (J\&\sim R\&((E|F)|(B|C|D))))|J\&(O|Q)\&\sim N\&\sim R)) \quad (1)$$

$$(\sim I\&\sim J\&Q\&(P\&\sim K\&(R\&(\sim G|(\sim N\&\sim M\&\sim H)))| \\ (\sim N\&\sim M\&\sim H\&U\&\sim R))|(N\&\sim M\&\sim H\& \\ ((\sim K\&\sim G|(\sim A\&\sim C\&\sim B)))) \quad (2)$$

$$(L\&P\&\sim N\&\sim R\&((I\&J)|(\sim K\&\sim J\&(Q\&(I|H))| \\ (M\&H))) \quad (3)$$

$$(\sim K\&\sim M\&P(\sim O\&\sim T\&J\&N\&I(R|S)\&\sim Q)| \\ (\sim N\&\sim J\&\sim I\&Q\&R\&T\&\sim H)) \quad (4)$$

Equations 1 to 4 show Boolean expressions for the rules, where "&" symbol stands for an AND operation, "~" symbol stands for a NOT operation, "|" symbol stands for an OR operation. The equations 1 to 4 also include alphabets "A" to "U" that refer to the respective rule cells A to U shown in the kernel 202 and indicate their corresponding states. For example, the alphabets may represent an active state (e.g., value=1) unless preceded by the "~" symbol, which may refer to an inactive state (e.g., value=0) of the corresponding rule cell.

In some embodiments, the predetermined rules may include one or more sub-rules, each of which may implement a kernel pattern based on the states, for example, active state or inactive state, of the rule cells. For example, the equation 1 may be expanded (as shown in equation 5) into six sub-rules (as shown in equations 6 to 11), which undergo an OR operation with each other.

$$(M\&\sim N\&\sim K\&Q\&(H|G|I))| \\ (M\&\sim N\&\sim K\&Q\&\sim P\&\sim I\&\sim J\&\sim H\&\sim G)| \\ (M\&\sim N\&\sim K\&\sim R\&\sim J\&(I|Q)\&(B|T))| \\ (M\&\sim N\&\sim K\&\sim R\&L\&O\&(I|T))| \\ (M\&\sim N\&J\&\sim R\&((E|F)|(B|C|D)))|(M\&J\&(O|Q) \\ \&\sim N\&\sim R) \quad (5)$$

$$(M\&\sim N\&\sim K\&Q\&(H|G|I)) \quad (6)$$

$$(M\&\sim N\&\sim K\&Q\&\sim P\&\sim I\&\sim J\&\sim H\&\sim G) \quad (7)$$

$$(M\&\sim N\&\sim K\&\sim R\&\sim J\&(I|Q)\&(B|T)) \quad (8)$$

$$(M\&\sim N\&\sim K\&\sim R\&L\&O\&(I|T)) \quad (9)$$

$$(M\&\sim N\&J\&\sim R\&((E|F)|(B|C|D))) \quad (10)$$

$$(M\&J\&(O|Q)\&\sim N\&\sim R) \quad (11)$$

Figure 3A:
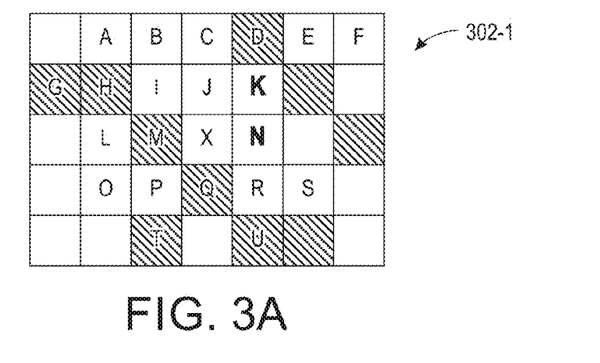
FIGS. 3A-3F illustrate exemplary patterns for the kernel of FIG. 2, according to an embodiment of the present disclosure.
Figure 3B:
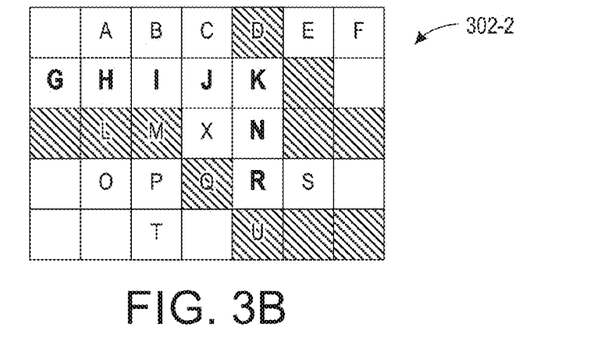
Figure 3C:
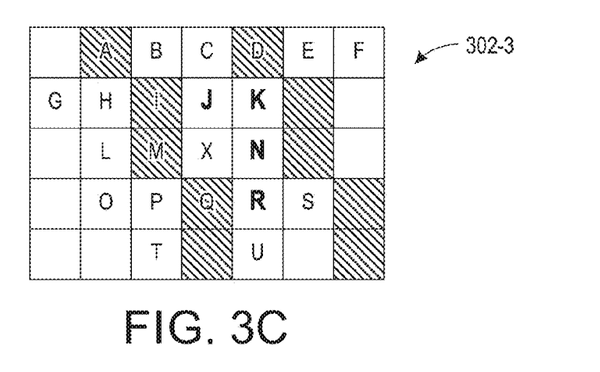
Figure 3D:
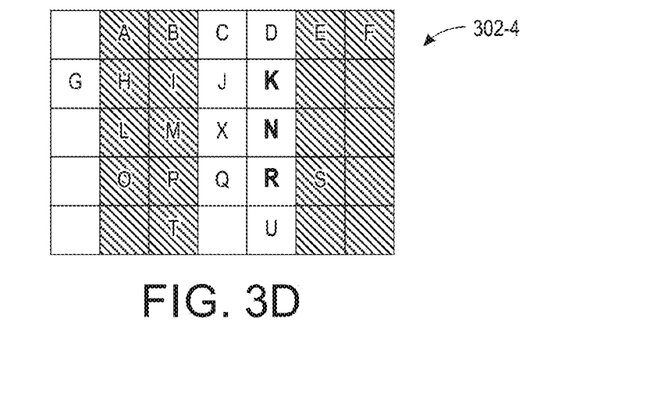
Figure 3E:
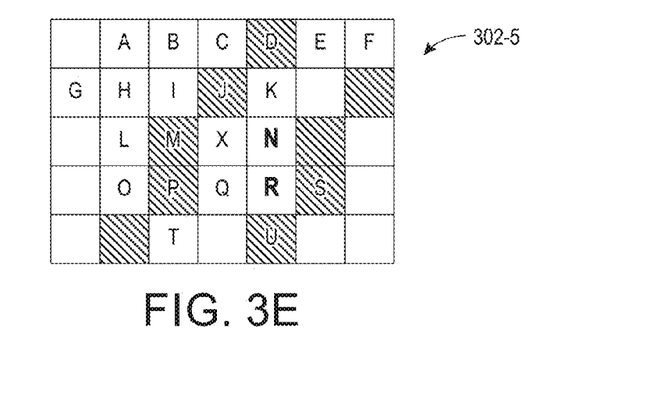
Figure 3F:
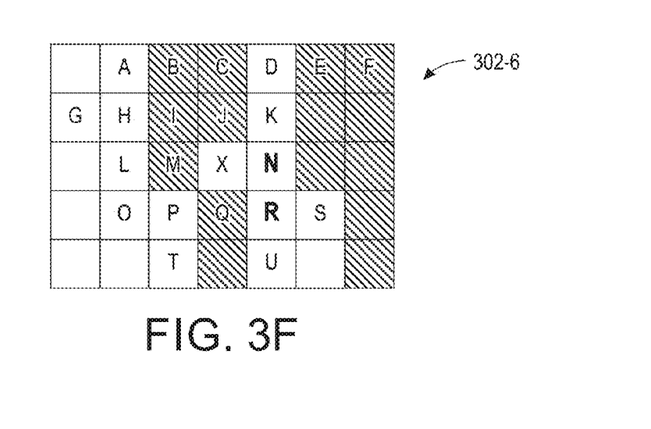

Each sub-rule may be applied to the kernel 202 for generating different kernel patterns that detect at least one pair of closely spaced thin lines, each being oriented in the same or different directions. For example, the sub-rule of equation 6 may be applied to generate a first patterned kernel 202 (FIG. 3A), the sub-rule of equation 7 may be applied to generate a second patterned kernel 202 (FIG. 3B), the sub-rule of equation 8 may be applied to generate a third patterned kernel 202 (FIG. 3C), the sub-rule of equation 9 may be applied to generate a fourth patterned kernel 202 (FIG. 3D), the sub-rule of equation 10 may be applied to generate a fifth patterned kernel 202 (FIG. 3E), and the sub-rule of equation 11 may be applied to generate a sixth patterned kernel 202 (FIG. 3F). Similar to the rule in equation 1, other rules such as those shown in equations 2 to 4 may be applied to the kernel 202 to detect thin lines in a halftone image. In some embodiments, various rules may be predetermined based on the kernel size and the number of thin lines to be detected.

In the patterned kernels 302-1, 302-2, 302-3, 302-4, 302-5, and 302-6 (collectively, patterned kernels 302), each of the patterned cells and white cells may indicate the applied rules, such as those shown in equations 1 to 4, that need to be true for activating an inactive image pixel that is located at the processing cell X in the kernel 202. Such inactive image pixel is hereinafter referred to as processing pixel X* (not shown). In the neighborhood of the processing pixel X*, the patterned cells, for example, the cells D, G, H, M, Q, T, U in FIG. 3A, represent the rule cells that check for active pixels (e.g., value=1), and the white cells check for inactive pixels (e.g., value=0) when the kernel 202 is associated with the halftone image. In some embodiments, certain white cells may be predefined to check for mandatory presence of inactive pixels in the halftone image based on the predetermined rules to maintain a predefined separation between the processing pixel X*, upon being activated, and a neighboring active pixel. Such predefined white cells are hereinafter referred to as preset cells. In the illustrated example of FIG. 3A, the patterned kernel 302-1 includes the white cells K and N being defined as preset cells based on the sub-rule of equation 6. Similarly, the patterned kernel 302-2 may include the white cells G, H, I, J, K, N, R being defined as preset cells; the patterned kernel 302-3 may include preset cells J, K, N, R being defined as preset cells; the patterned kernel 302-4 may include preset cells K, N, R being defined as preset cells; the patterned kernel 302-5 may include preset cells N, R being defined as preset cells; and the patterned kernel 302-6 may include preset cells N, R being defined as preset cells.

The enhancement unit 108 may determine the state of halftone image pixels (i.e., the active pixels or the inactive pixels) in the neighborhood of the processing pixel X* based on each sub-rule of the predetermined rules being implemented using the kernel 202. When a predetermined rule or, in some embodiments, a predetermined sub-rule is true (e.g., having a result value=1), the enhancement unit 108 may perform an OR operation between the rule result (i.e., rule result=1) and a Boolean expression for a row, such as row 3, of the kernel 202 where the processing pixel X* is located in communication with the processing cell X. In other words, the inactive processing pixel X* (i.e., value=0) and an adjacent active pixel (i.e., value=1), which may form a portion of the thin line in the halftone image, may undergo an OR operation by the enhancement unit 108 to activate the inactive processing pixel X* for increasing the width of a thin line. Such Boolean activation of the processing pixel X* using the processing cell X of the kernel 202 is shown in an exemplary equation 12.

$$\sim X^* | M = X^* \qquad (12)$$

In equation 12, '|' symbol indicates the OR operation, '~X*' indicates the inactive processing pixel X* (e.g., having a value=0), 'M' indicates an active pixel (e.g., having a value=1) in communication with the thin line, and 'V' indicates the active processing pixel X* (e.g., having a value=1).

Further, the enhancement unit 108 may shift the processing cell X over the halftone image to associate the processing cell X with each pixel of the halftone image for determining the state of the neighboring pixels based on the predetermined rules. When the processing cell X is associated with the halftone image pixels, the associated pixel values may be stored in the variables for each of the corresponding check cells in the kernel 202. The pixel values may be used by the enhancement unit 108 to determine whether a halftone image pixel is in active state or inactive state. For example, the state of a pixel may be determined to be inactive by the enhancement unit 108 if a related value of the pixel is zero, otherwise the pixel may be determined to be active.

Upon associating the processing cell X with an image pixel, the check cells that are located outside the halftone image undergo bit stuffing. According to the bit stuffing method, the enhancement unit 108 inputs a dummy data bit, for example, a zero bit, into the variables for cells located outside the halftone image. The dummy data bit indicates a value for non-relevant or non-existing image pixels. Such bit stuffing allows appropriate computation of the predetermined rules for a valid determination of thin lines with respect to the orientation of the halftone image. However, a person ordinarily skilled in the art may implement other suitable methods known in the art, related art, or developed later for computation of predetermined rules within a region of interest in the halftone image for thin-line determination. The processing cell X shifts on a pixel-by-pixel basis for analyzing inactive pixels in the halftone image. Each new corresponding inactive pixel that is spaced from a neighboring active pixel by at least one inactive pixel (e.g., a white pixel or a background pixel) may be activated by the enhancement unit 108 using the processing cell X as discussed above. In one embodiment, the inactive pixel may be in communication with a thin line.

In one embodiment, the enhancement unit 108 may include any of the known, related art, or later developed interfaces that may be accessed by a user to dynamically control the enhancement unit 108 for varying the width of a thin line maximum by N pixels, which is defined in equation 7.

$$N = Max - 1 \qquad (13)$$

Figure 4:
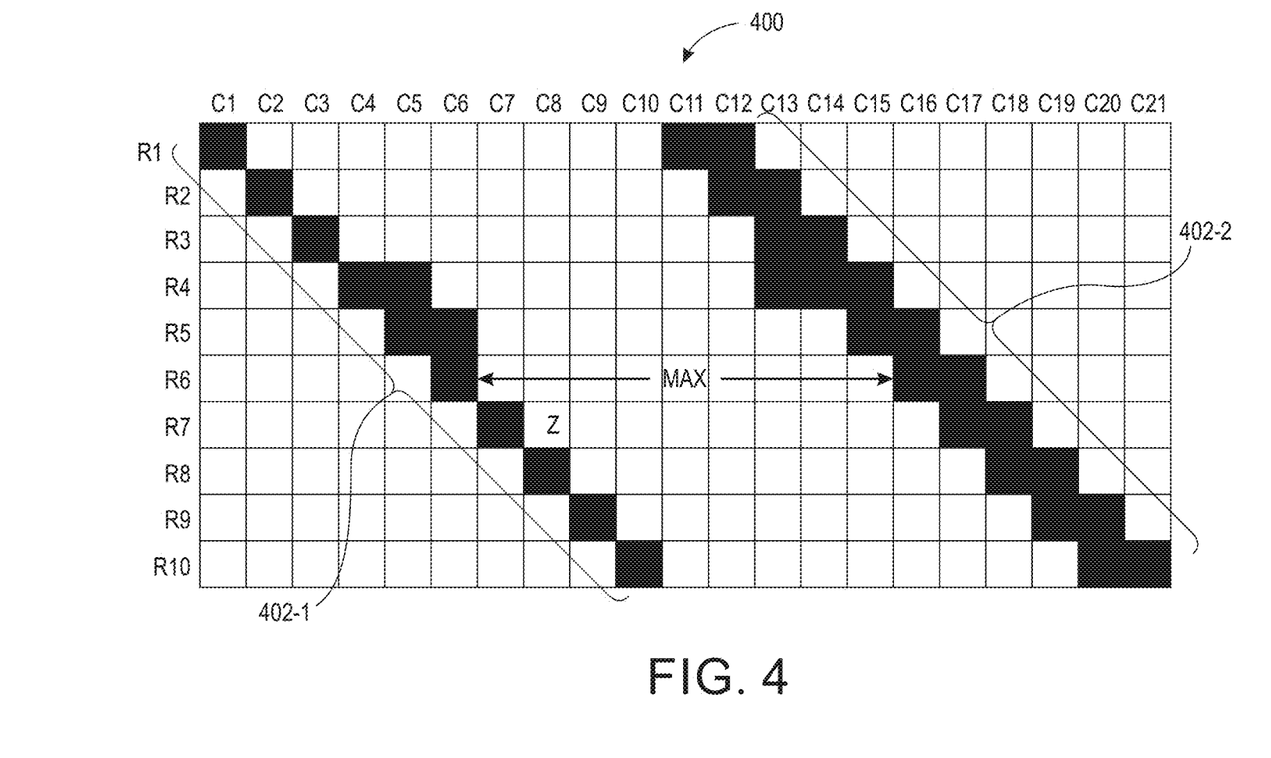
FIG. 4 illustrates an exemplary halftone image having thin lines in close proximity with each other, according to an embodiment of the present disclosure.

In equation 13, 'Max' refers to the maximum number of inactive pixels (e.g., those pixels which are not active) between a pair of active pixels located on separate thin lines. These active pixels may be separated by the shortest pixelated distance between the thin lines. For example as shown in FIG. 4, a first thin line 402-1 may be separated from a second thin line 402-2 by nine inactive pixels (e.g., white pixels). From pixel Z in communication with the first thin line 402-1, the width of the first thin line 402-1 may be increased maximum by eight pixels (i.e., 9−1=8) in order to maintain a separation of at least one inactive pixel between the first thin line 402-1 and the second thin line 402-2 (collectively, thin lines 402).

The thin-line width may be varied up to N pixels based on predefined enhancement levels, which may be configured into the enhancement unit 108 as predefined enhancement modes. Each enhancement mode may be bounded by a predefined condition that maintains a predefined separation (e.g., using inactive pixels) between the thin lines. In one embodiment, the enhancement unit 108 may be configured with three enhancement modes for activating a predefined number of inactive pixels to increase the width of the thin line.

In a first enhancement mode, the enhancement unit 108 may activate one or more inactive pixels in communication with an active pixel, which is in communication with the thin line. The number of inactive pixels activated upon user request or determined by enhancement unit 108 may be equivalent to a number of inactive pixels that maintains the maximum initial pixel width of the thin line. For example, as shown in FIG. 4, only a single pixel Z in communication with the thin line 402-1 may be activated by the enhancement unit 108 if the predetermined maximum initial width of the thin line 402-1 is set at two active pixels. In a second enhancement mode, the enhancement unit 108 may activate up to three additional inactive pixels in communication with an active pixel of the thin line 402-1, provided any of the newly active pixels are spaced by at least one inactive pixel from a neighboring active pixel of the thin line 402-2. In a third enhancement mode, the enhancement unit 108 may activate only one additional pixel in communication with an active pixel of the thin line 402-1 provided the newly active pixel is not merged with a neighboring active pixel of the thin line 402-2. An active pixel may be said to be merged with a neighboring active pixel when there is no inactive pixel (e.g., a white pixel) between the active pixel and the neighboring active pixel. The enhancement unit 108 may be configured to execute the three enhancement modes in a predefined order. For example, the enhancement unit 108 may automatically, or manually by a user, activate the first enhancement mode initially, then after completion of processing of the first enhancement mode, activate the second enhancement mode, followed by the third enhancement mode. However, in some embodiments, such enhancement modes may be executed in any order by the enhancement unit 108 based on one or more user requests. In some embodiments, the enhancement unit 108 may allow a user to apply each predefined enhancement mode multiple times while maintaining a predefined separation between each pair of active pixels in which at least one active pixel is in communication with a portion of a thin line.

Figure 5A:
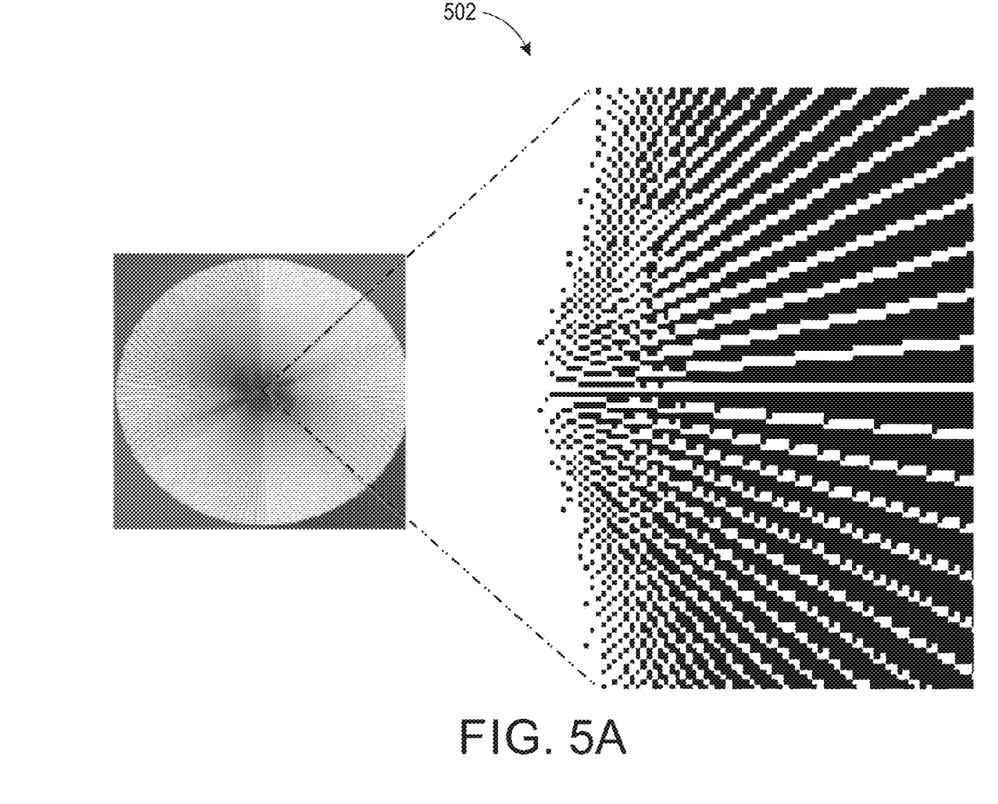
FIG. 5A illustrates an exemplary halftone image without thin-line enhancement, according to an embodiment of the present disclosure.
Figure 5B:
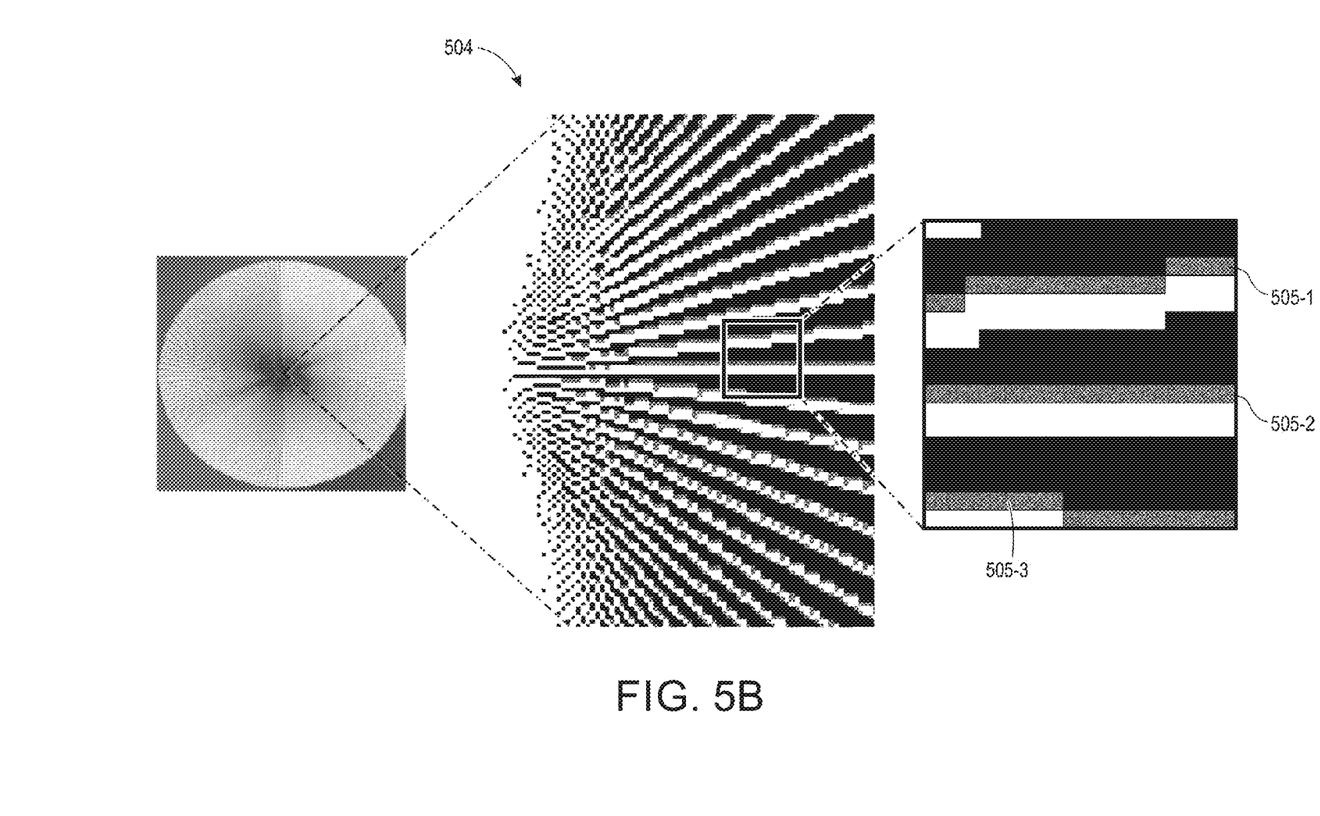
FIG. 5B illustrates an exemplary first modified halftone image with a first level of thin-line enhancement using the rule-using thin-line enhancement unit of FIG. 1, according to an embodiment of the present disclosure.
Figure 5C:
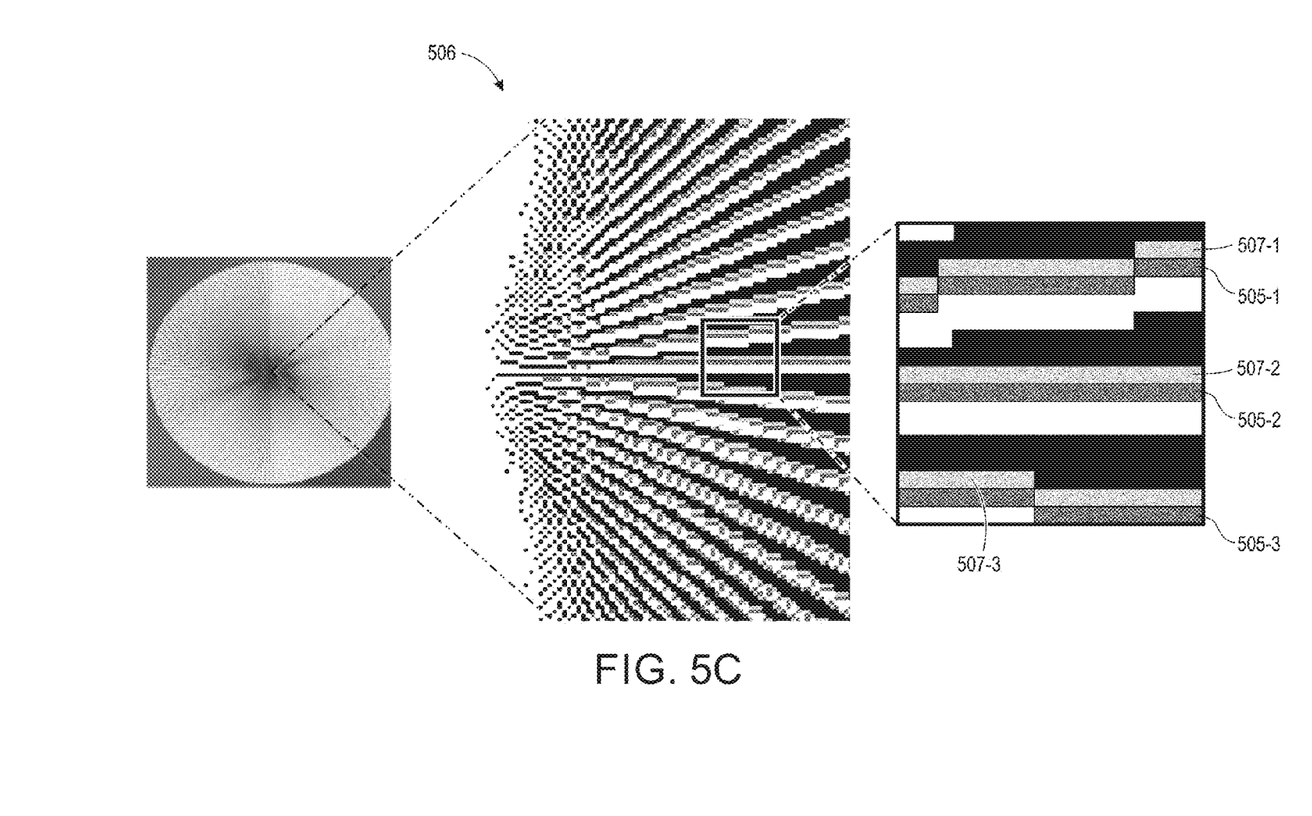
FIG. 5C illustrates an exemplary second modified halftone image with a second level of thin-line enhancement using the rule-based thin-line enhancement unit of FIG. 1, according to an embodiment of the present disclosure.
Figure 5D:
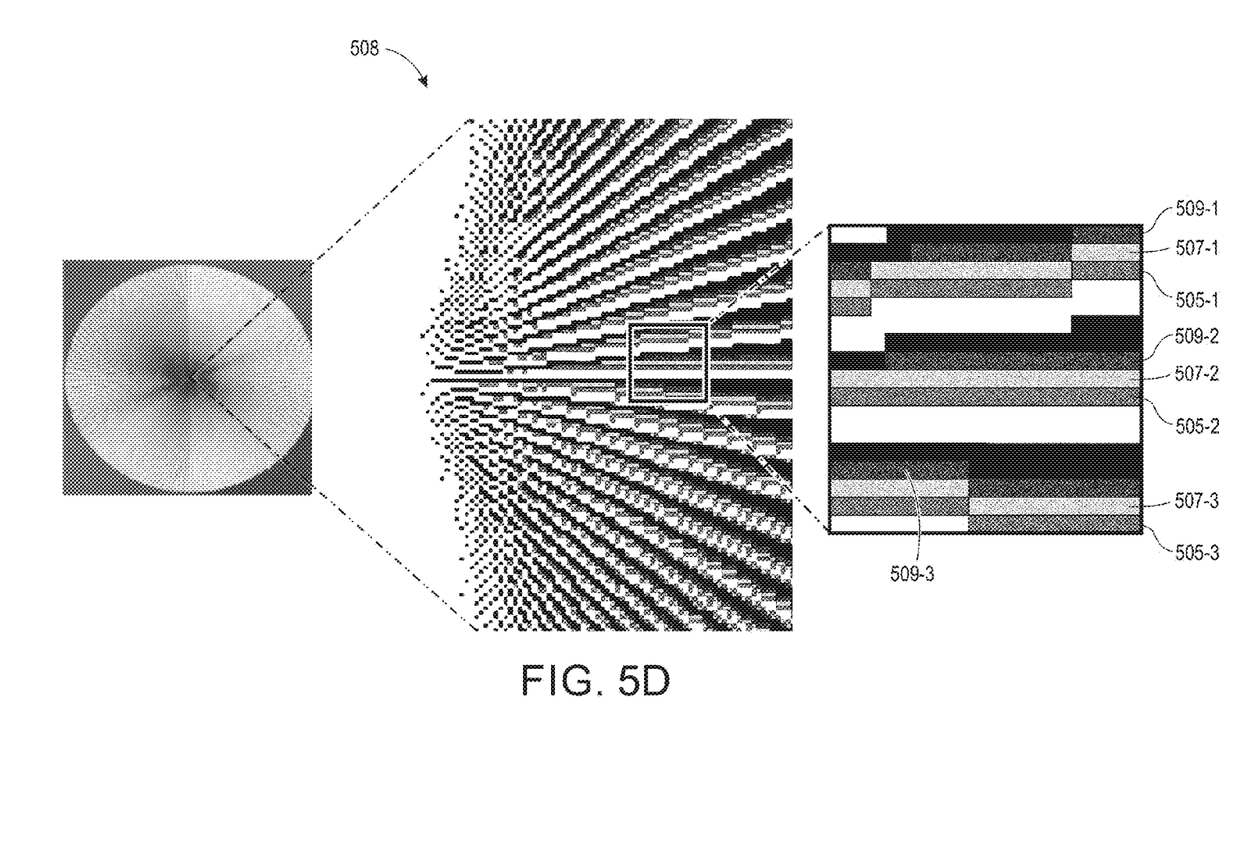
FIG. 5D illustrates an exemplary third modified halftone image with a third level of thin-line enhancement using the rule-based thin-line enhancement unit of FIG. 1, according to an embodiment of the present disclosure.

The enhancement unit 108 may execute the enhancement modes using the kernel 202 based on the predetermined rules in a halftone image, for example, a halftone image 502 shown in FIG. 5A, based on one or more user requests. In a first example shown in FIG. 5B, the enhancement unit 108 may modify a halftone image 502 based on the predetermined rules to generate a first modified image 504 by applying the first enhancement mode. The first modified image 504 illustrates a first set of pixels such as pixels 505-1, 505-2, and 505-3 (collectively, first pixel set 505) that indicate the newly activated pixels using the kernel 202 under the first enhancement mode. In a second example shown in FIG. 5C, the enhancement unit 108 may modify the first modified image 504 based on the applied predetermined rules to generate a second modified image 506 by applying the second enhancement mode. The second modified image 506 illustrates a second set of pixels such as pixels 507-1, 507-2, and 507-3 (collectively, second pixel set 507), in addition to the first pixel set 505. The second pixel set 507 indicates the newly or additionally activated pixels using the kernel 202 under the second enhancement mode. In a third example shown in FIG. 5D, the enhancement unit 108 may modify the second modified image 506 based on the applied predetermined rules to generate a third modified image 508 by applying the third enhancement mode. The third modified image 508 illustrates a third set of pixels such as pixels 509-1, 509-2, and 509-3 (collectively, third pixel set 509), in addition to the first pixel set 505 and the second pixel set 507. The third pixel set 509 indicates the newly or additionally activated pixels using the kernel 202 under the third enhancement mode.

Figure 6:
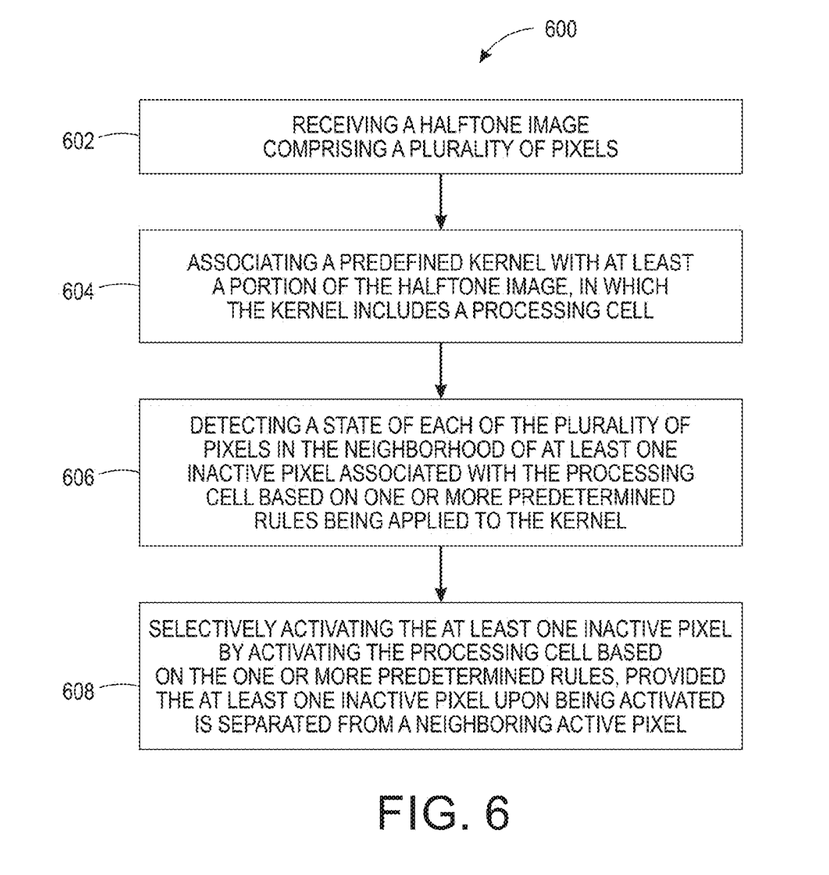
FIG. 6 illustrates an exemplary method for implementing the rule-based thin-line enhancement unit of FIG. 1, according to an embodiment of the present disclosure.

FIG. 6 illustrates an exemplary method for implementing the rule-based thin-line enhancement unit, according to an embodiment of the present disclosure. The exemplary method 600 may be described in the general context of computer executable instructions. Generally, computer executable instructions may include routines, programs, objects, components, data structures, procedures, modules, functions, and the like that perform particular functions or implement particular abstract data types. The computer executable instructions may be stored on a computer readable medium, and installed or embedded in an appropriate device for execution. Furthermore, the method 600 may be implemented in any suitable hardware, software, firmware, or combination thereof, that exists in the related art or that is later developed.

The order in which the method 600 is described is not intended to be construed as a limitation, and any number of the described method blocks may be combined or otherwise performed in any order to implement the method 600, or an alternate method. Additionally, individual blocks may be deleted from the method 600 without departing from the spirit and scope of the present disclosure described herein.

The method 600 describes an exemplary implementation of the enhancement unit 108. One having ordinary skill in the art will understand that the method 600 may be modified appropriately for implementation with other configurations and methods without departing from the scope and spirit of the disclosure.

At step 602, a halftone image is received. The enhancement unit 108 receives a halftone image having various tones of gray or color being produced as patterns of various sized dots. The halftone image may be received from the halftone generator 106 or a storage space such as the memory unit 104. The halftone image may include a number of active pixels and inactive pixels arranged in a predetermined pattern. For example, the halftone image may include one or more thin lines such as the thin lines 402, each being a contiguous set of active pixels, which may be separated from another thin line by one or more inactive pixels. In some embodiments, a thin line such as the thin line 402-1 may be two-pixel wide or any other width depending on the image resolution.

At step 604, a predefined kernel 202 is associated with at least a portion of the received halftone image. The kernel 202 may refer to a matrix of cells that defines a region of interest in an electronic image such as the halftone image where the predetermined rules may be applied. The kernel 202 may be stored in the memory unit 104 and fetched by the enhancement unit 108 for use. The size of the kernel 202 may be predefined based on the number of thin lines to be determined in the halftone image. For example, the kernel 202 may be a 5×7 matrix having five rows and seven columns for determining a closely-spaced pair of thin lines in the halftone image. The kernel 202 may include a processing cell X and multiple check cells, each capable of being shifted from an inactive state to an active state, and vice versa.

The enhancement unit 108 may be configured to apply the predetermined rules such as those shown in equations 1 to 4 to the kernel 202 for converting one or more check cells into rule cells that are in active state (e.g., value=1). In one embodiment, the enhancement unit 108 may associate the kernel 202, particularly the processing cell X, with at least a portion of the halftone image to detect one or more thin lines, their respective directions, and spacing there between.

At step 606, a state of each of the pixels in the neighborhood of at least one inactive pixel associated with the processing cell X based on one or more predetermined rules being applied to the kernel is detected. The enhancement unit 108 may be configured to associate the processing cell X with a portion of the halftone image on a pixel-by-pixel basis and detect an inactive pixel in the halftone image at an image location associated with the processing pixel X. In one embodiment, the inactive pixel may be in communication with a contiguous set of active pixels, for example, a thin line. Neighboring pixels of such inactive pixel may also be verified by the enhancement unit 108 for being active or inactive based on the predetermined rules such as those in equations 1 to 4 applied to the kernel 202. The predetermined rules transform one or more inactive check cells (e.g., having value=0) of the kernel 202 into a set of rule cells, which are in active state (e.g., having value=1). The rest of the check cells may be inactive (e.g., having value=0). The inactive check cells may include preset cells, such as the preset cells N and R in FIG. 3E, which represent a mandatory condition that requires the correspondingly associated image pixels to be inactive in the halftone image. In some embodiments, the check cells including the rule cells that are outside the boundary of the halftone image may be given dummy bit values (e.g., value=0) based on bit stuffing for ease in computation.

At step 608, the at least one inactive pixel is selectively activated by activating the processing cell X based on the one or more predetermined rules, provided the at least one inactive pixel upon being activated is separated from a neighboring active pixel. When the applied predetermined rule is true (e.g., result value=1) the enhancement unit 108 may detect an inactive pixel being in communication with the contiguous set of active pixels using the set of rule cells. Such inactive pixel may be selectively activated while the inactive pixel being separated from a neighboring active pixel by performing an OR operation between the rule result (i.e., result value=1) and a Boolean expression for a matrix row, such as row three, of the kernel 202 where the corresponding inactive cell may be located, for example, as discussed above with respect to equation 12.

In some embodiments, the enhancement unit 108 may selectively activate the inactive pixel associated with the processing cell X based on one or more predefined levels upon receiving a user request. Each of the predefined levels may define a predefined set of inactive pixels that can be activated by the enhancement unit 108, where the inactive pixels may be in communication with a contiguous set of active pixels. Such predefined set of inactive pixels may be less than the maximum number of inactive pixels along the shortest pixelated distance between the selectively activated inactive pixel and a neighboring active pixel. One ordinarily skilled in the art will be able to understand that the above method 600 can be applied to an inverse halftone image that includes inactive pixels being represented as black or any other color pixels (e.g., having a non-zero value) and active pixels being represented as white pixels (e.g., having value=0).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

What is claimed is:

1. A computer-implemented method for thin-line enhancement in electronic images, the method comprising:
   receiving, using a rule-based thin-line enhancement unit, a halftone image comprising a plurality of pixels;
   associating, using the rule-based thin-line enhancement unit, a predefined kernel with at least a portion of the halftone image, wherein the kernel includes a plurality of check cells and at least one processing cell, each check cell and processing cell capable of being toggled between an active state and an inactive state;
   detecting, using the rule-based thin-line enhancement unit, a state of each of the plurality of pixels in the neighborhood of at least one inactive pixel associated with the at least one processing cell based on one or more predetermined rules being applied to the kernel, wherein the at least one inactive pixel is in communication with a contiguous set of active pixels; and
   selectively activating, using the rule-based thin-line enhancement unit, the at least one inactive pixel by activating the processing cell based on the one or more predetermined rules, provided the at least one inactive pixel upon being activated is separated from a neighboring active pixel.

2. The method of claim 1, wherein the selectively activated at least one inactive pixel is separated from the neighboring active pixel by at least one directly adjacent inactive pixel.

3. The method of claim 1, wherein at least one of the one or more predetermined rules include one or more sub-rules.

4. The method of claim 1, wherein the detecting includes shifting the processing cell shifts to each cell in the kernel.

5. The method of claim 1, further comprising detecting the direction of the contiguous set of active pixels based on an associated set of rule cells among the plurality of check cells, wherein the associated set of rule cells are activated based on the one or more predetermined rules.

6. The method of claim 1, wherein the kernel is a matrix having a configurable number of rows and columns of the cells, and wherein the matrix is transposed upon changing the orientation of the halftone image.

7. The method of claim 1, wherein the at least one inactive pixel is selectively activated based on one or more predefined levels upon receiving a user request, and wherein each of the one or more predefined levels defines a predefined set of inactive pixels in communication with the contiguous set of active pixels.

8. The method of claim 7, wherein the predefined set of inactive pixels is less than a maximum number of inactive pixels along a shortest pixelated distance between the selectively activated at least one inactive pixel and the neighboring active pixel.

9. A system for thin-line enhancement of electronic images, the system comprising:
   an imaging unit configured to capture an electronic image of a predetermined resolution;
   a halftone generator configured to convert the captured electronic image into a halftone image comprising a plurality of pixels;
   a memory unit configured to store a predefined kernel including a plurality of check cells and at least one processing cell, each check cell and processing cell capable of being toggled between an active state and an inactive state; and
   a rule-based thin-line enhancement unit configured to:
   receive the halftone image from the halftone generator and the kernel from the memory unit;
   associate the kernel with at least a portion of the halftone image;
   detect a state of each of the plurality of pixels in the neighborhood of at least one inactive pixel associated with the at least one processing cell based on one or more predetermined rules being applied to the kernel, wherein the at least one inactive pixel is in communication with a contiguous set of active pixels; and
   selectively activate the at least one inactive pixel by activating the processing cell based on the one or more predetermined rules, provided the at least one inactive pixel upon being activated is separated from a neighboring active pixel.

10. The system of claim 9, wherein the selectively activated at least one inactive pixel is separated from the neighboring active pixel by at least one directly adjacent inactive pixel.

11. The system of claim 9, wherein at least one of the one or more predetermined rules include one or more sub-rules.

12. The system of claim 9, wherein the detecting includes shifting the processing cell shifts to each cell in the kernel.

13. The system of claim 9, wherein the rule-based thin-line enhancement unit is further configured to detect the direction of the contiguous set of active pixels based on an associated set of rule cells among the plurality of check cells, wherein the associated set of rule cells are activated based on the one or more predetermined rules.

14. The system of claim 9, wherein the kernel is a matrix having a configurable number of rows and columns of the cells, and wherein the matrix can be transposed upon changing the orientation of the halftone image.

15. The system of claim 9, wherein the at least one inactive pixel is selectively activated based on one or more predefined levels upon receiving a user request, wherein each of the one or more predefined levels defines a predefined set of inactive pixels in communication with the contiguous set of active pixels.

16. The system of claim 15, wherein the predefined set of inactive pixels is less than a maximum number of inactive pixels along a shortest pixelated distance between the selectively activated at least one inactive pixel and the neighboring active pixel.

17. A non-transitory computer-readable medium comprising computer-executable instructions for computing trust index among a plurality of entities associated with a resource marketplace, the non-transitory computer-readable medium comprising instructions for:
   receiving a halftone image comprising a plurality of pixels;
   associating a predefined kernel with at least a portion of the halftone image, wherein the kernel includes a plurality of check cells and at least one processing cell, each check cell and processing cell capable of being toggled between an active state and an inactive state;

detecting a state of each of the plurality of pixels in the neighborhood of at least one inactive pixel associated with the at least one processing cell based on one or more predetermined rules being applied to the kernel, wherein the at least one inactive pixel is in communication with a contiguous set of active pixels; and selectively activating the at least one inactive pixel by activating the processing cell based on the one or more predetermined rules, provided the at least one inactive pixel upon being activated is separated from a neighboring active pixel.

18. The non-transitory computer-readable medium of claim 17, wherein at least one of the one or more predetermined rules include one or more sub-rules.

19. The non-transitory computer-readable medium of claim 17, wherein the detecting includes shifting the processing cell shifts to each cell in the kernel.

20. The non-transitory computer-readable medium of claim 17, further comprising detecting the direction of the contiguous set of active pixels based on an associated set of rule cells among the plurality of check cells, wherein the associated set of rule cells are activated based on the one or more predetermined rules.

21. The non-transitory computer-readable medium of claim 17, wherein the kernel is a matrix having a configurable number of rows and columns of the cells, and wherein the matrix can be transposed upon changing the orientation of the halftone image.

22. The non-transitory computer-readable medium of claim 17, wherein the selectively activated at least one inactive pixel is separated from the neighboring active pixel by minimum one inactive pixel.

23. The non-transitory computer-readable medium of claim 17, wherein the at least one inactive pixel is selectively activated based on one or more predefined levels upon receiving a user request, wherein each of the one or more predefined levels defines a predefined set of inactive pixels in communication with the contiguous set of active pixels.

24. The non-transitory computer-readable medium of claim 23, wherein the predefined set of inactive pixels is less than a maximum number of inactive pixels along a shortest pixelated distance between the selectively activated at least one inactive pixel and the neighboring active pixel.

* * * * *